(12) United States Patent
He et al.

(10) Patent No.: US 12,483,502 B2
(45) Date of Patent: Nov. 25, 2025

(54) PACKET FORWARDING METHOD AND DEVICE, AND SYSTEM

(71) Applicant: HUAWEI TECHNOLOGIES CO., LTD., Guangdong (CN)

(72) Inventors: Jiao He, Beijing (CN); Haibo Wang, Beijing (CN); Zuliang Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/366,920

(22) Filed: Aug. 8, 2023

(65) Prior Publication Data

US 2023/0388228 A1 Nov. 30, 2023

Related U.S. Application Data

(63) Continuation of application No. PCT/CN2021/143308, filed on Dec. 30, 2021.

(30) Foreign Application Priority Data

Feb. 9, 2021 (CN) .......................... 202110182228.7

(51) Int. Cl.
*H04L 45/00* (2022.01)
*H04L 12/46* (2006.01)
*H04L 45/24* (2022.01)

(52) U.S. Cl.
CPC ........ *H04L 45/566* (2013.01); *H04L 12/4633* (2013.01); *H04L 45/24* (2013.01)

(58) Field of Classification Search
None
See application file for complete search history.

(56) References Cited

U.S. PATENT DOCUMENTS

| 7,751,405 | B1 * | 7/2010 | Kompella | H04L 47/70 370/254 |
| 11,374,988 | B1 * | 6/2022 | Lanier | H04L 65/4015 |
| 2007/0091793 | A1 * | 4/2007 | Filsfils | H04L 45/28 370/228 |

(Continued)

FOREIGN PATENT DOCUMENTS

| CN | 106130920 A | 11/2016 |
| CN | 111245644 A | 6/2020 |

(Continued)

*Primary Examiner* — Phyllis A Book
(74) *Attorney, Agent, or Firm* — Rimon PC

(57) ABSTRACT

Embodiments of this disclosure include a packet forwarding method and device, and a related system, and belong to the field of communication technologies. In the method, a first node first receives a route to a destination node sent by a second node, where the route carries an identifier of the second node and a plurality of tunnel attributes. A plurality of tunnels from the first node to the second node are in a one-to-one correspondence with the plurality of tunnel attributes. The first node forwards packets with different packet attributes destined for a same destination node through different tunnels. By having the packets with the different packet attributes forwarded over the different tunnels, traffic steering is implemented at a routing layer, and a flexibility of performing the packet forwarding is improved.

18 Claims, 7 Drawing Sheets

(56) References Cited

U.S. PATENT DOCUMENTS

| | | | |
|---|---|---|---|
| 2008/0225852 A1* | 9/2008 | Raszuk | H04L 45/50 370/392 |
| 2009/0232003 A1* | 9/2009 | Vasseur | H04L 12/4633 370/236.2 |
| 2010/0177784 A1* | 7/2010 | Asati | H04L 12/4633 370/463 |
| 2014/0086253 A1* | 3/2014 | Yong | H04L 49/70 370/395.53 |
| 2015/0146536 A1 | 5/2015 | Minei et al. | |
| 2015/0154291 A1* | 6/2015 | Shepherd | H04L 67/535 707/748 |
| 2015/0169069 A1* | 6/2015 | Lo | H04L 65/403 715/753 |
| 2016/0073054 A1* | 3/2016 | Balasaygun | H04L 12/1822 348/14.08 |
| 2016/0164780 A1* | 6/2016 | Timmons | H04L 45/70 370/238 |
| 2016/0188125 A1* | 6/2016 | Kaplan | G06F 3/0481 715/730 |
| 2018/0026933 A1 | 1/2018 | Asati et al. | |
| 2018/0109450 A1 | 4/2018 | Filsfils et al. | |
| 2018/0375676 A1* | 12/2018 | Bader-Natal | G06F 3/0481 |
| 2019/0088153 A1* | 3/2019 | Bader-Natal | H04N 7/147 |
| 2019/0124128 A1* | 4/2019 | Bader-Natal | G06Q 10/101 |
| 2020/0153915 A1* | 5/2020 | Jain | H04L 67/535 |
| 2020/0344162 A1* | 10/2020 | Dutta | H04L 47/724 |
| 2020/0380468 A1* | 12/2020 | Crawford | H04L 67/55 |
| 2020/0382618 A1* | 12/2020 | Faulkner | H04L 65/403 |
| 2021/0058264 A1* | 2/2021 | Fahrendorff | H04L 12/1822 |
| 2021/0099401 A1* | 4/2021 | Singh | H04L 45/306 |
| 2021/0385150 A1* | 12/2021 | Shrivastava | H04L 45/02 |
| 2021/0399911 A1* | 12/2021 | Jorasch | H04L 12/1822 |
| 2021/0400142 A1* | 12/2021 | Jorasch | H04N 7/147 |
| 2022/0014580 A1* | 1/2022 | Shadfar | G06F 3/04817 |
| 2022/0086393 A1* | 3/2022 | Peters | G06V 20/41 |
| 2022/0138470 A1* | 5/2022 | Seleskerov | G06V 40/23 382/159 |
| 2022/0141532 A1* | 5/2022 | Li | G06V 40/174 725/14 |
| 2022/0247975 A1* | 8/2022 | Lanier | H04L 12/1822 |

FOREIGN PATENT DOCUMENTS

| | | | | |
|---|---|---|---|---|
| CN | 111865805 A | | 10/2020 | |
| EP | 3754913 A1 | * | 12/2020 | H04L 12/4633 |
| EP | 3799366 A1 | | 3/2021 | |
| EP | 3873042 A1 | | 9/2021 | |
| WO | WO-2019062249 A1 | * | 4/2019 | H04L 45/16 |
| WO | WO-2019162210 A1 | * | 8/2019 | H04L 45/04 |

* cited by examiner

PACKET FORWARDING METHOD AND DEVICE, AND SYSTEM

CROSS-REFERENCE TO RELATED APPLICATIONS

This application is a continuation of International Application No. PCT/CN2021/143308, filed on Dec. 30, 2021, which claims priority to Chinese Patent Application No. 202110182228.7, filed on Feb. 9, 2021. Both of the aforementioned applications are hereby incorporated by reference in their entireties.

TECHNICAL FIELD

This application generally relates to the field of communication technologies, and in particular, to a packet forwarding method and device, and a system.

BACKGROUND

Communication systems typically include a plurality of nodes, where the nodes are utilized to forward packets over tunnels.

When forwarding a packet, the node may search for, based on a destination node that the packet is destined for, a route of the destination node. The route includes a next-hop identifier and a color attribute of a tunnel. Then, the node may determine a target tunnel based on the next-hop identifier and the color attribute, and forward the packet through the target tunnel. The target tunnel is a tunnel from the node to a different node that is indicated by the next-hop identifier, and a color attribute of the target tunnel is the same as the color attribute in the route.

It can be learned that all packets sent to a same node are forwarded through a same tunnel. However, different packets may have different forwarding performance requirements, resulting in a poor packet forwarding effect.

SUMMARY

Embodiments of this application provide for a packet forwarding method and device, and a related system, to resolve a problem with conventional technologies that result in poor packet forwarding effect. The technical solutions are as follows:

According to a first aspect, a packet forwarding method is provided. The method includes that a first node first receives a route to a destination node sent by a second node, where the route carries an identifier of the second node and a plurality of tunnel attributes. The first node determines a plurality of tunnels from the first node to the second node based on the plurality of tunnel attributes carried in the route, determines, after obtaining a packet destined for the destination node, a target tunnel from the plurality of tunnels based on a packet attribute carried in the packet, and forwards the packet to the second node through the target tunnel. The plurality of tunnels are in a one-to-one correspondence with the plurality of tunnel attributes, and the tunnels have corresponding tunnel attributes.

The route of the destination node carries the identifier of the second node. For example, the second node may include the identifier of the second node in the route as a next-hop identifier. In this case, the route of the destination node carries the next-hop identifier, where the next-hop identifier is the identifier of the second node. Certainly, the second node may alternatively not include the identifier of the second node in the route as the next-hop identifier. This is not limited in this application.

In the packet forwarding method provided in some embodiments, the first node may determine, based on the plurality of tunnel attributes carried in the route sent by the second node, the plurality of tunnels through which the first node forwards, to the second node, the packet destined for the destination node. When forwarding the packet, the first node may select one target tunnel from the plurality of tunnels based on the packet attribute carried in the packet, and forward the packet on the target tunnel. Therefore, different packet attributes may be carried in packets based on different requirements on forwarding performance of the packets, so that packets having different requirements on the forwarding performance can be forwarded over different target tunnels. In this way, requirements of different nodes relating to forwarding performance of their packets and requirements of a same node on forwarding performance of different packets can be met, thereby improving a packet forwarding effect and implementing traffic steering.

Optionally, after determining the plurality of tunnels that are in a one-to-one correspondence with the plurality of tunnel attributes carried in the route, the first node may further obtain, based on the indication information corresponding to the tunnel attributes carried in the route of the destination node, indication information corresponding to each tunnel of the plurality of tunnels. The indication information corresponding to each tunnel is indication information corresponding to a tunnel attribute corresponding to the tunnel. When determining the target tunnel from the plurality of tunnels based on target indication information, the first node may determine, based on the indication information corresponding to the plurality of tunnels, a tunnel corresponding to the target indication information as the target tunnel.

The route of the destination node may be implemented in a plurality of manners.

In a possible implementation, the route further carries a plurality of pieces of indication information, and the plurality of pieces of indication information are in a one-to-one correspondence with the plurality of tunnel attributes. When determining the target tunnel from the plurality of tunnels based on the packet attribute, the first node may first determine, from the plurality of pieces of indication information, the target indication information that matches the packet attribute. The first node determines the target tunnel from the plurality of tunnels based on the target indication information, where a tunnel attribute of the target tunnel corresponds to the target indication information.

For example, when determining the target indication information, the first node may determine, based on a correspondence between the packet attribute and the indication information, indication information of the packet attribute carried in the corresponding packet in the correspondence as the target indication information. For another example, when determining the target indication information, the first node may alternatively determine the target indication information based on a specific (e.g., pre-determined) matching rule. For example, information that matches the packet attribute is determined as the target indication information based on a preset (e.g., pre-determined) operation rule.

In another possible implementation, when determining the target tunnel from the plurality of tunnels based on the packet attribute, the first node may first determine, from the plurality of tunnel attributes, a target tunnel attribute that matches the packet attribute. The first node determines, from the plurality of tunnels, the target tunnel that has the target tunnel attribute. For a process in which the first node determines, from the plurality of tunnel attributes, the target tunnel attribute that matches the packet attribute, refer to the foregoing process in which the first node determines, from the plurality of pieces of indication information, the target indication information that matches the packet attribute. Details are not described herein again in this application.

The route that is of the destination node and that is sent by the second node may carry the plurality of tunnel attributes and the plurality of pieces of indication information in any manner. Optionally, the route of the destination node includes a plurality of type length value (TLV) fields. The plurality of TLV fields are in a one-to-one correspondence with the plurality of tunnel attributes, and each TLV field carries a corresponding tunnel attribute.

Optionally, indication information corresponding to a tunnel attribute in the route may alternatively be carried in a TLV field corresponding to the tunnel attribute. Optionally, indication information corresponding to a tunnel attribute in the route is carried in another field of the route, instead of a TLV field corresponding to the tunnel attribute.

In this application, that the route of the target node carries, using the TLV fields, the tunnel attributes and the indication information that needs to be carried in some implementations is used as an example. Certainly, the route of the target node may alternatively carry the tunnel attributes in another manner, and may alternatively carry the indication information that needs to be carried in some implementations in another manner. This is not limited in this application.

Optionally, the tunnel attributes in the route that is of the destination node and that is sent by the second node may be any type of attribute of the tunnel, for example, a color attribute.

Optionally, the indication information in the route that is of the destination node and that is sent by the second node may be any type of information. For example, the indication information may include a preference value corresponding to the color attribute.

Optionally, the packet destined for the destination node carries the packet attribute, and the packet attribute may be any type of attribute of the packet, for example, a priority. For example, the packet attribute may include at least one of a differentiated services code point (DSCP) priority, an Internet Protocol (IP) priority, a communication protocol 802.1p priority, and a multiprotocol label switching Exp (MPLS Exp).

According to a second aspect, a packet forwarding method is provided. The method includes that a second node sends a route of a destination node to a first node, and the second node receives a packet forwarded by the first node through a target tunnel. The route carries an identifier of the second node and a plurality of tunnel attributes. The route is configured to indicate the first node to determine a plurality of tunnels from the first node to the second node based on the plurality of tunnel attributes, determine the target tunnel from the plurality of tunnels based on a packet attribute carried in a packet destined for the destination node, and forward the packet to the second node through the target tunnel. The plurality of tunnels are in a one-to-one correspondence with the plurality of tunnel attributes, and the tunnels have corresponding tunnel attributes.

In the packet forwarding method provided in this application, the second node sends, to the first node, the route carrying the plurality of tunnel attributes, so that the first node may determine, based on the plurality of tunnel attributes, the plurality of tunnels through which the first node forwards, to the second node, the packet destined for the destination node. When forwarding the packet, the first node may select one target tunnel from the plurality of tunnels based on the packet attribute carried in the packet, and forward the packet on the target tunnel. Therefore, different packet attributes may be carried in packets based on different requirements on forwarding performance of the packets, so that packets having different requirements on the forwarding performance can be forwarded over different target tunnels. In this way, requirements of different nodes on forwarding performance of packets and requirements of a same node on forwarding performance of different packets can be met, thereby improving a packet forwarding effect and implementing traffic steering.

The route of the destination node may be implemented in a plurality of manners.

In a possible implementation, the route further carries a plurality of pieces of indication information, and the plurality of pieces of indication information are in a one-to-one correspondence with the plurality of tunnel attributes. The route is configured to indicate the first node to determine, from the plurality of pieces of indication information, target indication information that matches the packet attribute. The route is further configured to indicate the first node to determine the target tunnel from the plurality of tunnels based on the target indication information, where a tunnel attribute of the target tunnel corresponds to the target indication information.

In another possible implementation, the route is configured to indicate the first node to determine, from the plurality of tunnel attributes, a target tunnel attribute that matches the packet attribute and determine, from the plurality of tunnels, the target tunnel that has the target tunnel attribute.

The route that is of the destination node and that is sent by the second node may carry the plurality of tunnel attributes and the plurality of pieces of indication information in any manner. Optionally, the route of the destination node includes a plurality of TLV fields. The plurality of TLV fields are in a one-to-one correspondence with the plurality of tunnel attributes, and each TLV field carries a corresponding tunnel attribute.

Optionally, indication information corresponding to a tunnel attribute in the route may alternatively be carried in a TLV field corresponding to the tunnel attribute. Optionally, the indication information corresponding to a tunnel attribute in the route is carried in another field of the route, instead of a TLV field corresponding to the tunnel attribute.

Optionally, the tunnel attributes in the route that are of the destination node and that are sent by the second node may be any type of attribute of the tunnel, for example, a color attribute.

Optionally, the indication information in the route that is of the destination node and that is sent by the second node may be any type of information. For example, the indication information includes a preference value corresponding to the color attribute.

Optionally, the packet destined for the destination node carries the packet attribute, and the packet attribute may be any type of attribute of the packet, for example, a priority. For example, the packet attribute may include at least one of a DSCP priority, an IP priority, an 802.1p priority, or an MPLS Exp.

According to a third aspect, a packet forwarding device is provided. The packet forwarding device includes a receiving module, a first determining module, an obtaining module, a second determining module, and a forwarding module. The receiving module is configured to receive a route to a destination node sent by a second node, where the route carries an identifier of the second node and a plurality of tunnel attributes. The first determining module is configured to determine a plurality of tunnels from the first node to the second node based on the plurality of tunnel attributes, where the plurality of tunnels are in a one-to-one correspondence with the plurality of tunnel attributes, and the tunnels have corresponding tunnel attributes. The obtaining module is configured to obtain a packet destined for the destination node, where the packet carries a packet attribute. The second determining module is configured to determine a target tunnel from the plurality of tunnels based on the packet attribute. The forwarding module is configured to forward the packet to the second node through the target tunnel.

In the packet forwarding device provided in this application, the first determining module may determine, based on the plurality of tunnel attributes carried in the route sent by the second node, the plurality of tunnels through which the first node forwards, to the second node, the packet destined for the destination node. Before the forwarding module forwards the packet, the second determining module may select one target tunnel from the plurality of tunnels based on the packet attribute carried in the packet, so that the forwarding module can forward the packet on the target tunnel. Therefore, different packet attributes may be carried in packets based on different requirements on forwarding performance of the packets, so that packets having different requirements on the forwarding performance can be forwarded over different target tunnels. In this way, requirements of different nodes on forwarding performance of packets and requirements of a same node on forwarding performance of different packets can be met, thereby improving a packet forwarding effect and implementing traffic steering.

There may be a plurality of manners for the second determining module to determine the target tunnel from the plurality of tunnels based on the packet attribute. The following uses two manners as examples for description.

In a possible implementation, the route further carries a plurality of pieces of indication information, and the plurality of pieces of indication information are in a one-to-one correspondence with the plurality of tunnel attributes. The second determining module is configured to determine, from the plurality of pieces of indication information, target indication information that matches the packet attribute and determine the target tunnel from the plurality of tunnels based on the target indication information. A tunnel attribute of the target tunnel corresponds to the target indication information.

In another possible implementation, the second determining module is configured to determine, from the plurality of tunnel attributes, a target tunnel attribute that matches the packet attribute. The second determining module is further configured to determine, from the plurality of tunnels, the target tunnel that has the target tunnel attribute.

The route that is of the destination node and that is sent by the second node may carry the plurality of tunnel attributes and the plurality of pieces of indication information in any manner.

Optionally, the route includes a plurality of TLV fields that are in a one-to-one correspondence with the plurality of tunnel attributes, and a TLV field carries a corresponding tunnel attribute. In this case, if the route further carries the indication information, indication information corresponding to a tunnel attribute may be carried in a TLV field corresponding to the tunnel attribute. Optionally, indication information corresponding to a tunnel attribute may alternatively be carried in another field of the route, instead of a TLV field corresponding to the tunnel attribute.

Optionally, the route includes the plurality of TLV fields that are in a one-to-one correspondence with the plurality of tunnel attributes, and a TLV field carries a corresponding tunnel attribute and indication information corresponding to the tunnel attribute.

The tunnel attributes may be any type of attribute of the tunnel. Optionally, the tunnel attributes include a color attribute.

The indication information may be any type of information. Optionally, the indication information includes a preference value corresponding to the color attribute.

The packet destined for the destination node carries the packet attribute, and the packet attribute may be any type of attribute of the packet. Optionally, the packet attribute includes at least one of a DSCP priority, an IP priority, an 802.1p priority, or an MPLS Exp.

According to a fourth aspect, a packet forwarding device is provided. The packet forwarding device includes a sending module and a receiving module. The sending module is configured to send a route of a destination node to a first node. The receiving module is configured to receive a packet forwarded by the first node through a target tunnel. The route carries an identifier of a second node and a plurality of tunnel attributes. The route is configured to indicate the first node to determine a plurality of tunnels from the first node to the second node based on the plurality of tunnel attributes, determine the target tunnel from the plurality of tunnels based on a packet attribute carried in a packet destined for the destination node, and forward the packet to the second node through the target tunnel. The plurality of tunnels are in a one-to-one correspondence with the plurality of tunnel attributes, and the tunnels have corresponding tunnel attributes.

In the packet forwarding device provided in this application, the route sent by the sending module to the first node carries the plurality of tunnel attributes. Therefore, the first node can determine, based on the plurality of tunnel attributes, the plurality of tunnels through which the first node forwards, to the second node, the packet destined for the destination node. When forwarding the packet, the first node may select one target tunnel from the plurality of tunnels based on the packet attribute carried in the packet, and forward the packet on the target tunnel. Therefore, different packet attributes may be carried in packets based on different requirements on forwarding performance of the packets, so that packets having different requirements on the forwarding performance can be forwarded over different target tunnels. In this way, requirements of different nodes on forwarding performance of packets and requirements of a same node on forwarding performance of different packets can be met, thereby improving a packet forwarding effect and implementing traffic steering.

The foregoing route may be implemented in a plurality of manners. The following uses two manners as examples for description.

In a possible implementation, the route further carries a plurality of pieces of indication information, and the plurality of pieces of indication information are in a one-to-one correspondence with the plurality of tunnel attributes.

The route is configured to indicate the first node to determine, from the plurality of pieces of indication information, target indication information that matches the packet attribute and determine the target tunnel from the plurality of tunnels based on the target indication information. A tunnel attribute of the target tunnel corresponds to the target indication information.

In another possible implementation, the route is configured to indicate the first node to determine, in the plurality of tunnel attributes carried in the route, a target tunnel attribute that matches the packet attribute and determine, from the plurality of tunnels, the target tunnel that has the target tunnel attribute.

The route that is of the destination node and that is sent by the second node may carry the plurality of tunnel attributes and the plurality of pieces of indication information in any manner.

Optionally, the route includes a plurality of TLV fields that are in a one-to-one correspondence with the plurality of tunnel attributes, and a TLV field carries a corresponding tunnel attribute. In this case, if the route further carries the indication information, indication information corresponding to a tunnel attribute may be carried in a TLV field corresponding to the tunnel attribute. Optionally, indication information corresponding to a tunnel attribute may alternatively be carried in another field of the route, instead of being carried in a TLV field corresponding to the tunnel attribute.

Optionally, the route includes the plurality of TLV fields that are in a one-to-one correspondence with the plurality of tunnel attributes, and a TLV field carries a corresponding tunnel attribute and indication information corresponding to the tunnel attribute.

The tunnel attributes may be any type of attribute of the tunnel. Optionally, the tunnel attributes include a color attribute.

The indication information may be any type of information. Optionally, the indication information includes: a preference value corresponding to the color attribute.

The packet destined for the destination node carries the packet attribute, and the packet attribute may be any type of attribute of the packet. Optionally, the packet attribute includes at least one of a DSCP priority, an IP priority, an 802.1p priority, or an MPLS Exp.

According to a fifth aspect, a communication system is provided. The communication system includes a first node and a second node. The second node is configured to send a route of a destination node to the first node, where the route carries an identifier of the second node and a plurality of tunnel attributes. The first node is configured to determine a plurality of tunnels from the first node to the second node based on the plurality of tunnel attributes, and after obtaining a packet destined for the destination node, determine a target tunnel from the plurality of tunnels based on a packet attribute carried in the packet, and forward the packet to the second node through the target tunnel. The plurality of tunnels are in a one-to-one correspondence with the plurality of tunnel attributes, and the tunnels have corresponding tunnel attributes.

In the communication system provided in this application, the second node sends, to the first node, the route carrying the plurality of tunnel attributes, so that the first node may determine, based on the plurality of tunnel attributes, the plurality of tunnels through which the first node forwards, to the second node, the packet destined for the destination node. When forwarding the packet, the first node may select one target tunnel from the plurality of tunnels based on the packet attribute carried in the packet, and forward the packet on the target tunnel. Therefore, different packet attributes may be carried in packets based on different requirements on forwarding performance of the packets, so that packets having different requirements on the forwarding performance can be forwarded over different target tunnels. In this way, requirements of different nodes on forwarding performance of packets and requirements of a same node on forwarding performance of different packets can be met, thereby improving a packet forwarding effect and implementing traffic steering.

The route of the destination node may be implemented in a plurality of manners.

In a possible implementation, the route further carries a plurality of pieces of indication information, and the plurality of pieces of indication information are in a one-to-one correspondence with the plurality of tunnel attributes. The first node is configured to determine, from the plurality of pieces of indication information, target indication information that matches the packet attribute and then determine the target tunnel from the plurality of tunnels based on the target indication information. A tunnel attribute of the target tunnel corresponds to the target indication information.

In another possible implementation, the first node is configured to determine, from the plurality of tunnel attributes, a target tunnel attribute that matches the packet attribute and then determine, from the plurality of tunnels, the target tunnel that has the target tunnel attribute.

The route that is of the destination node and that is sent by the second node may carry the plurality of tunnel attributes and the plurality of pieces of indication information in any manner. Optionally, the route of the destination node includes a plurality of TLV fields. The plurality of TLV fields are in a one-to-one correspondence with the plurality of tunnel attributes, and each TLV field carries a corresponding tunnel attribute.

Optionally, indication information corresponding to a tunnel attribute in the route may alternatively be carried in a TLV field corresponding to the tunnel attribute. Optionally, indication information corresponding to a tunnel attribute in the route is carried in another field of the route, instead of a TLV field corresponding to the tunnel attribute.

Optionally, the tunnel attributes in the route that are of the destination node and that are sent by the second node may be any type of attribute of the tunnel, for example, a color attribute.

Optionally, the indication information in the route that is of the destination node and that is sent by the second node may be any type of information. For example, the indication information includes a preference value corresponding to the color attribute.

Optionally, the packet destined for the destination node carries the packet attribute, and the packet attribute may be any type of attribute of the packet, for example, a priority. For example, the packet attribute may include at least one of a DSCP priority, an IP priority, an 802.1p priority, or an MPLS Exp.

According to a sixth aspect, a communication device is provided. The communication device includes a processor and a memory. The memory stores a program, and the processor is configured to invoke the program stored in the memory, to enable the communication device to perform the packet forwarding method according to any design of the first aspect.

According to a seventh aspect, a communication device is provided. The communication device includes a processor and a memory. The memory stores a program, and the processor is configured to invoke the program stored in the memory, to enable the communication device to perform the packet forwarding method according to any design of the second aspect.

According to an eighth aspect, a computer storage medium is provided. The storage medium stores a computer program, and the computer program is configured to perform the packet forwarding method according to any design of the first aspect.

According to a ninth aspect, a computer storage medium is provided. The storage medium stores a computer program, and the computer program is configured to perform the packet forwarding method according to any design of the second aspect.

According to a tenth aspect, a computer program product including instructions is provided. When the computer program product is run on a packet forwarding device, the packet forwarding device is enabled to perform the packet forwarding method according to any design of the first aspect.

According to an eleventh aspect, a computer program product including instructions is provided. When the computer program product is run on a packet forwarding device, the packet forwarding device is enabled to perform the packet forwarding method according to any design of the second aspect.

For technical effects brought by any design manner in the second aspect to the eleventh aspect, refer to technical effects brought by the corresponding design manner in the first aspect. Details are not described herein again.

DESCRIPTION OF EMBODIMENTS

To make principles and technical solutions of this application clearer, the following disclosure further describes implementations of this application in detail with reference to the accompanying drawings.

A communication system usually includes a plurality of nodes, and the nodes in the communication system may be any device that can forward a packet, such as a router and a gateway. A tunnel for forwarding a packet may be deployed in the communication system. The tunnel in embodiments of this application may be any type of tunnel, for example, a segment routing Internet Protocol version 6 policy (SRv6 policy)-based tunnel, a segment routing traffic engineering policy (SR-TE policy) tunnel, or a segment routing best effort policy (SR-BE policy) tunnel.

The tunnel includes a plurality of nodes (which may be located in a same network domain or may be located in different network domains). The tunnel may be a tunnel from a head node to a tail node in the plurality of nodes, and a packet transmitted on the tunnel can be transmitted from the head node to the tail node. In addition, the tunnel has a color attribute that may be used to indicate a service level agreement (SLA) corresponding to the tunnel.

For the head node in the plurality of nodes, information about a plurality of tunnels may be configured on the head node, and the head node can forward the packet on any tunnel based on information about any tunnel in the plurality of tunnels. For example, the head node is a first node. Before the first node forwards the packet, a second node (such as a tail node of a tunnel in which the head node is located) sends, to the first node, a route of a destination node connected to the second node. The route includes an identifier of the second node and a color attribute. After receiving the route, the first node may determine a target tunnel corresponding to the route in the plurality of tunnels based on the route. A head node of the target tunnel is the first node, a tail node is the second node, and the tunnel has the color attribute in the route. After receiving a packet that needs to be sent to the destination node, the first node forwards the packet on the target tunnel corresponding to the route of the destination node.

Figure 1:
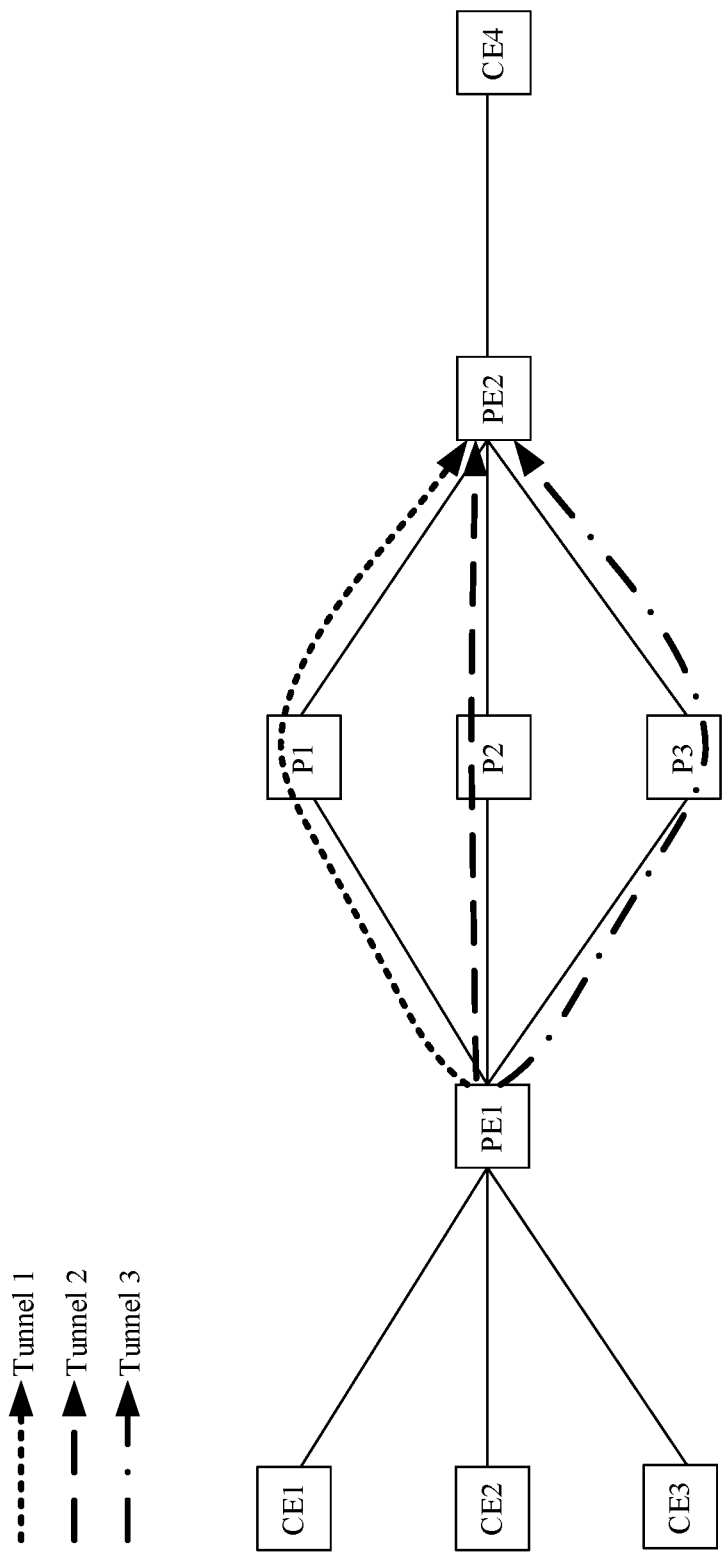
FIG. 1 is a schematic diagram of a scenario of forwarding a packet along a tunnel, according to an embodiment of this application.

For example, FIG. 1 is a schematic diagram of a scenario of forwarding a packet along a tunnel according to an embodiment of this application. As shown in FIG. 1, the scenario includes a plurality of nodes, which are customer edge (CE) nodes CE1, CE2, CE3, and CE4, provider edge (PE) nodes PE1 and PE2, and provider (P) nodes P1, P2, and P3. The PEs and the CEs are private network neighbors of each other. For example, the CE1, the CE2, and the CE3 are all private network neighbors of the PE1, and the CE4 and the PE2 are private network neighbors of each other. The PEs are virtual private network (VPN) public network neighbors of each other. For example, the PE1 and the PE2 are VPN public network neighbors of each other. The PE1 and the PE2 are connected separately through P1, P2, and P3.

Information about a plurality of tunnels is configured on the PEs. For example, information about a tunnel 1, a tunnel 2, and a tunnel 3 is configured on the PE1. The tunnel 1 includes the PE1, the P1, and the PE2. The tunnel 2 includes the PE1, the P2, and the PE2. The tunnel 3 includes the PE1, the P3, and the PE2. Each tunnel in these tunnels has a color attribute. For example, a color attribute of the tunnel 1 is A1, a color attribute of the tunnel 2 is A2, and a color attribute of the tunnel 3 is A3.

Figure 2:
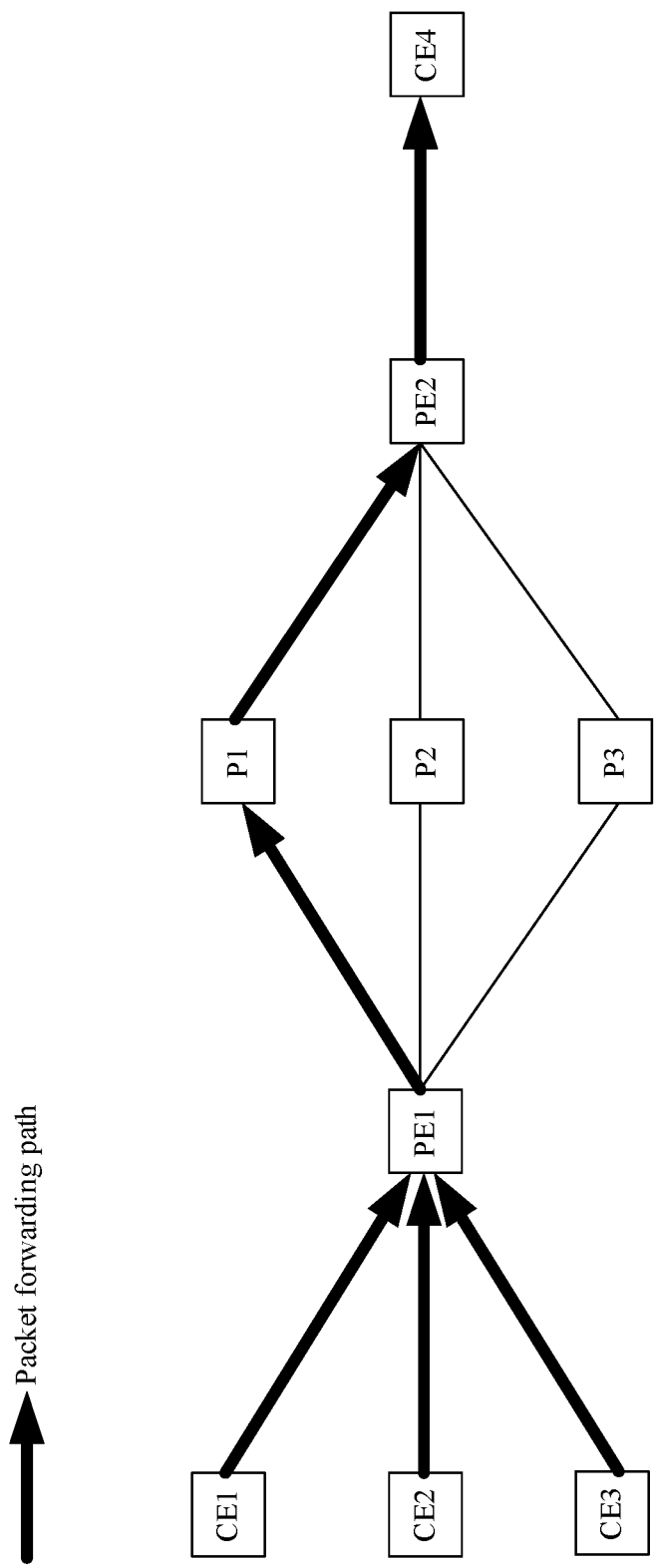
FIG. 2 is a schematic diagram of a packet forwarding path, according to an embodiment of this application.

The PE2 advertises a route of the CE4 to the PE1, where the route includes an identifier of the PE2 and a color attribute (for example, the color attribute A1). After receiving the route of the CE4, the PE1 finds, from the plurality of tunnels, a target tunnel (e.g., the tunnel 1) corresponding to the route of the CE4. A head node of the target tunnel is the PE1, a tail node is the PE2, and a color attribute of the tunnel is A1. As shown in FIG. 2, when each node in the CE1, the CE2, and the CE3 needs to send a packet to the CE4, the packet destined for the CE4 is sent to the PE1. After receiving the packet destined for the CE4, the PE1 forwards the packet on the target tunnel (e.g., tunnel 1). For example, the packet is forwarded along a path of the PE1, the P1, and the PE2. It can be seen that the packet sent by each node in the CE1, the CE2, and the CE3 is forwarded on a same target tunnel (e.g., tunnel 1).

However, the CE1, the CE2, and the CE3 may have different requirements with regard to forwarding performances of packets, and each node in the CE1, the CE2, and the CE3 may also have different requirements with regard to forwarding performances of different packets. However, if these packets are all forwarded on a same target tunnel, a packet forwarding effect is poor.

An embodiment of this application provides a packet forwarding method. In the method, a plurality of tunnels can be determined based on a plurality of tunnel attributes carried in a route, and a target tunnel for forwarding a packet can be selected from the plurality of tunnels based on a packet attribute carried in the packet. In this way, packets carrying different packet attributes can be forwarded on different tunnels, so that the requirements of the different nodes with regard to forwarding performances of the packets and the requirements of a same node with regard to forwarding performances of the different packets can be met, thereby improving a packet forwarding effect and implementing traffic steering.

The packet forwarding method provided in embodiments of this application may be applied to a communication system provided in embodiments of this application. Before the packet forwarding method provided in embodiments of this application is described, the communication system provided in embodiments of this application is first briefly described.

Figure 3:
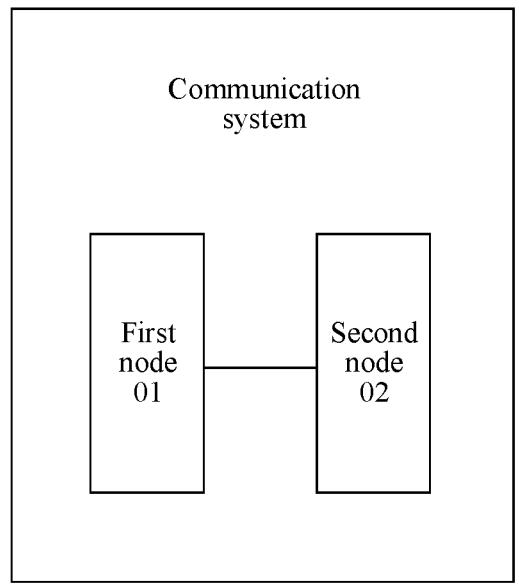
FIG. 3 is a schematic diagram of a structure of a communication system, according to an embodiment of this application.

For example, FIG. 3 is a schematic diagram of a structure of a communication system according to an embodiment of this application. The communication system includes a plurality of forwarding nodes, for example, a first node 01 and a second node 02 in FIG. 3. It should be noted that, the communication system may further include another forwarding node in addition to the first node 01 and the second node 02. This is not limited in embodiments of this application.

The forwarding nodes (for example, the first node 01 and the second node 02) in the communication system are all communication devices. For example, the communication device may include a processor. The processor is configured to, after being coupled to a memory and reading instructions in the memory, perform, based on the instructions, the method performed by the communication device described in embodiments of this application.

Figure 4:
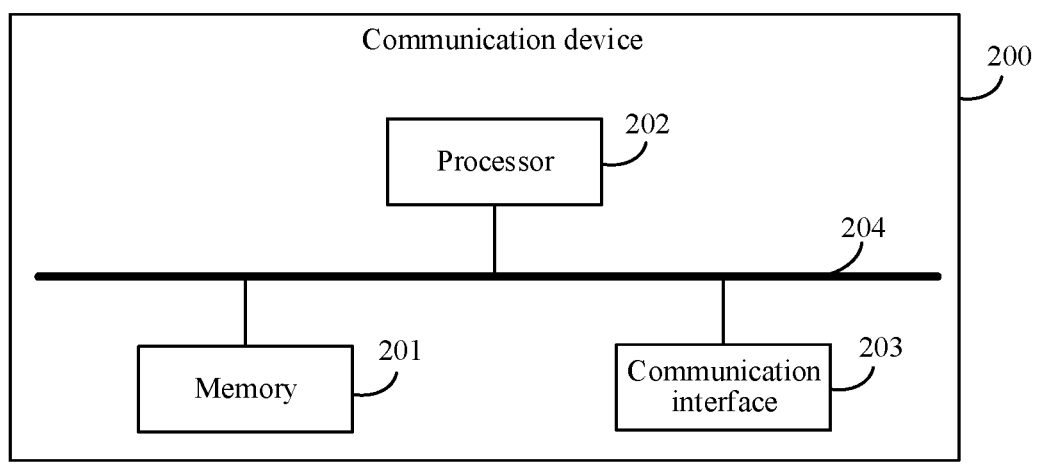
FIG. 4 is a schematic diagram of a structure of a communication device, according to an embodiment of this application.

In the communication device, there may be a plurality of processors, and the memory coupled to the processor may be independent of the processor or be independent of the communication device, or may be located inside the processor or a network device. The memory may be a physically independent unit, or may be storage space, a web disk, or the like on a cloud server. Optionally, there may be one or more memories. When there are a plurality of memories, the plurality of memories may be located at a same location or different locations, and may be used independently or in cooperation. For example, when the memory is located inside the communication device, refer to FIG. 4. FIG. 4 is a schematic diagram of a structure of a communication device according to an embodiment of this application. The communication device 200 includes a processor 202 and a memory 201. The memory 201 is configured to store a program. The processor 202 is configured to invoke the program stored in the memory 201, to enable the communication device to perform a corresponding method or function. Optionally, as shown in FIG. 4, the communication device 200 may further include at least one communication interface 203 and at least one communication bus 204. The memory 201, the processor 202, and the communication interface 203 are in a communication connection through the communication bus 204. The communication interface 203 is configured to communicate with another device under control of the processor 202, and the processor 202 may invoke, through the communication bus 204, the program stored in the memory 201.

Figure 5:
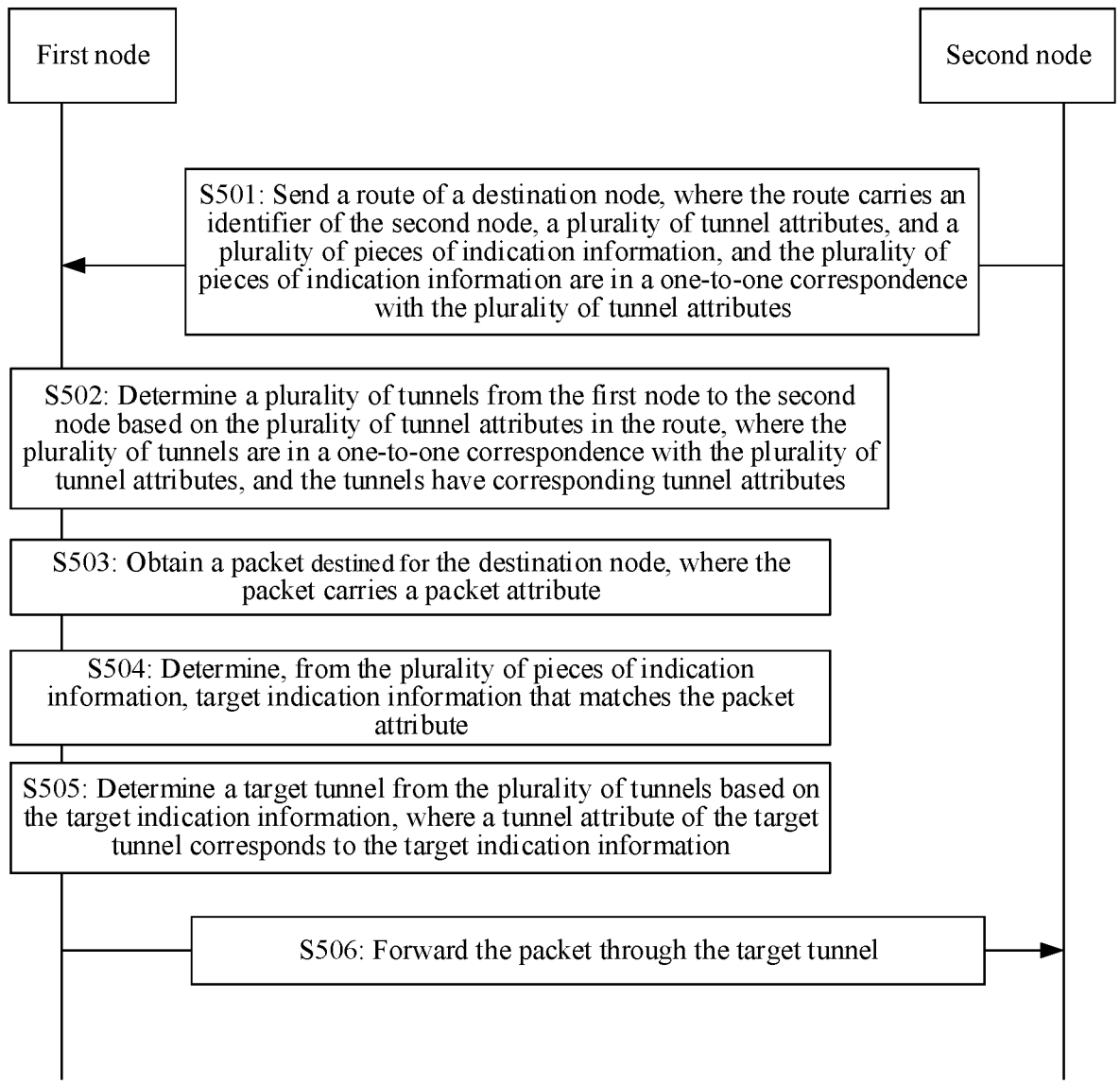
FIG. 5 is a flowchart of a packet forwarding method, according to an embodiment of this application.

The following disclosure uses an embodiment shown in FIG. 5 as an example to describe the packet forwarding method provided in embodiments of this application.

For example, FIG. 5 is a flowchart of a packet forwarding method according to an embodiment of this application. As shown in FIG. 5, the packet forwarding method may include the following steps:

S501: A second node sends a route of a destination node to a first node, where the route carries an identifier of the second node, a plurality of tunnel attributes, and a plurality of pieces of indication information, and the plurality of pieces of indication information are in a one-to-one correspondence with the plurality of tunnel attributes.

The destination node may be a node connected to the second node, and the second node is located on a path between the first node and the destination node. Using the scenario shown in FIG. 1 as an example, the first node may be the node PE1, the second node may be the node PE2, and the destination node may be the node CE4 or another type of device.

The route of the destination node carries the identifier of the second node. For example, the second node may include the identifier of the second node in the route as a next-hop identifier. In this case, the route of the destination node carries the next-hop identifier, and the next-hop identifier is the identifier of the second node. In a possible case, the second node may alternatively not include the identifier of the second node in the route as the next-hop identifier. This is not limited in some embodiments.

The route of the destination node further carries the plurality of tunnel attributes and the plurality of pieces of indication information corresponding to the plurality of tunnel attributes. The plurality of pieces of indication information are in a one-to-one correspondence with the plurality of tunnel attributes carried in the route. The tunnel attributes may be any type of attribute of the tunnel, for example, a color attribute. The indication information may be any type of information. For example, the indication information includes a preference value, a number, a priority, and the like.

In some embodiments, that the tunnel attribute is the color attribute and the indication information corresponding to the tunnel attribute is a preference value corresponding to the color attribute is used as an example. For example, as shown in Table 1, the route of the destination node may carry three color attributes: a color attribute A1, a color attribute A2, and a color attribute A3. The route may further carry three preference values: a preference value B1 corresponding to the color attribute A1, a preference value B2 corresponding to the color attribute A2, and a preference value B3 corresponding to the color attribute A3.

TABLE 1

| Color attribute | Preference value |
|---|---|
| A1 | B1 |
| A2 | B2 |
| A3 | B3 |

The route that is of the destination node and that is sent by the second node may carry the plurality of tunnel attributes and the plurality of pieces of indication information in any manner. For example, the route of the destination node includes a plurality of TLV fields, the plurality of TLV fields are in a one-to-one correspondence with the plurality of tunnel attributes, and each TLV field carries a corresponding tunnel attribute and indication information corresponding to the tunnel attribute. Optionally, a tunnel attribute may be carried in a corresponding TLV field, but the indication information corresponding to the tunnel attribute is carried in another field of the route, instead of the TLV field corresponding to the tunnel attribute.

Figure 6:
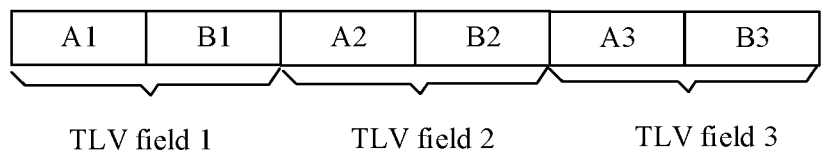
FIG. 6 is a schematic diagram of a local structure of a route of a destination node, according to an embodiment of this application.

For example, FIG. 6 is a schematic diagram of a local structure of a route of a destination node according to an embodiment of this application. It is assumed that color attributes and preference values carried in the route of the destination node are shown in Table 1. In this case, as shown in FIG. 6, the route includes three TLV fields, which are respectively a TLV field 1, a TLV field 2, and a TLV field 3. The TLV field 1 carries the color attribute A1 and the preference value B1, the TLV field 2 carries the color attribute A2 and the preference value B2, and the TLV field 3 carries the color attribute A3 and the preference value B3.

Figure 7:
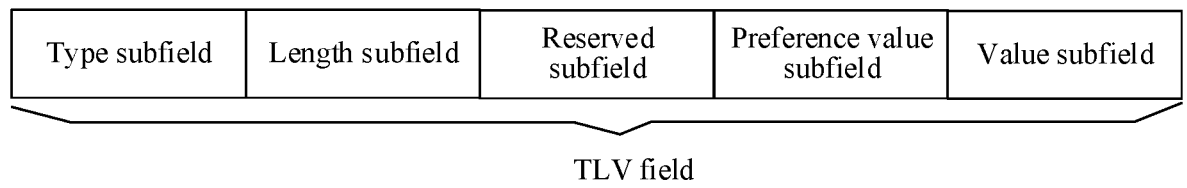
FIG. 7 is a schematic diagram of a structure of a type length value (TLV) field, according to an embodiment of this application.

The TLV fields in FIG. 6 may be implemented according to any feasible implementation taught by this disclosure. For example, a structure of each TLV field in FIG. 6 is shown in FIG. 7. The TLV field includes: a type subfield, a length subfield, a reserved subfield, a preference value subfield, and a value subfield that are distributed in sequence. The type subfield indicates a type of the TLV field, the length subfield indicates lengths of all subfields located behind the length subfield in the TLV field, the preference value subfield is used to carry a preference value that needs to be carried in the TLV field, and the value subfield is used to carry a color attribute that needs to be carried in the TLV field. Optionally, the type subfield, the length subfield, the reserved subfield, and the preference value subfield in FIG. 6 may all include 8 bits, and the value subfield may include 32 bits.

In some embodiments, that the route of the target node carries, using the TLV fields, the tunnel attributes and the indication information that needs to be carried in some implementations is used as an example. The route of the target node may alternatively carry the tunnel attributes in another manner, and may alternatively carry the indication information that needs to be carried in some implementations in another manner. This is not limited in some embodiments.

S502: The first node determines a plurality of tunnels from the first node to the second node based on the plurality of tunnel attributes in the route, where the plurality of tunnels are in a one-to-one correspondence with the plurality of tunnel attributes, and the tunnels have corresponding tunnel attributes.

Information about some tunnels may be configured on the first node, and information about each tunnel includes a head node, a tail node, and a tunnel attribute of the tunnel. The first node may select, based on the plurality of tunnel attributes carried in the route, the plurality of tunnels in a one-to-one correspondence with the plurality of tunnel attributes. A head node of each tunnel of the plurality of tunnels is the first node, a tail node is the second node, and the tunnel has a tunnel attribute corresponding to the tunnel.

For example, the tunnel attribute is the color attribute. As shown in Table 2, information about tunnels 1, 2, 3, 4, and 5 is configured on the first node. The tunnel 1 has the color attribute A1, the tunnel 2 has the color attribute A2, the tunnel 3 has the color attribute A3, the tunnel 4 has the color attribute A1, and the tunnel 5 has the color attribute A2. Head nodes of the tunnels 1, 2, and 3 are all the first node, and tail nodes are all the second node. Head nodes of the tunnels 4 and 5 are all the first node, and tail nodes are all a third node.

TABLE 2

| Tunnel | Head node | Tail node | Color attribute |
|---|---|---|---|
| 1 | First node | Second node | A1 |
| 2 | First node | Second node | A2 |
| 3 | First node | Second node | A3 |
| 4 | First node | Third node | A1 |
| 5 | First node | Third node | A2 |

The first node may select, based on the three color attributes and identifier information of the tail node that are shown in Table 1 and carried in the route, three tunnels in a one-to-one correspondence with the three color attributes from the five tunnels shown in Table 2. The three tunnels include tunnels 1, 2, and 3. The head nodes of the three tunnels are all the first node, and the tail nodes are all the second node. The tunnel 1 corresponds to the color attribute A1 carried in the route of the destination node, and the tunnel 1 has the color attribute A1. The tunnel 2 corresponds to the color attribute A2 carried in the route of the destination node, and the tunnel 2 has the color attribute A2. The tunnel 3 corresponds to the color attribute A3 carried in the route of the destination node, and the tunnel 3 has the color attribute A3.

After determining the plurality of tunnels that are in a one-to-one correspondence with the plurality of tunnel attributes carried in the route, the first node may select, by subsequent operations, a target tunnel from the plurality of tunnels, and forward, on the target tunnel, a packet that needs to be sent to the destination node.

S503: The first node obtains the packet destined for the destination node, where the packet carries a packet attribute.

The packet destined for the destination node may be a packet received by the first node, or the packet may be a packet generated by the first node. A manner for the first node to obtain the packet is not limited in some embodiments. For example, assuming that the first node is the node PE1 in FIG. 1, the second node is the node PE2, and the destination node is the node CE4, the packet may be a packet sent by the node CE1 to the node PE1.

The packet destined for the destination node carries the packet attribute, and the packet attribute may be any type of attribute of the packet, for example, a priority. For example, the packet attribute may include at least one of a differentiated services code point (DSCP) priority, an internet protocol (IP) priority, an 802.1p priority, or a multiprotocol label switching Exp (MPLS) Exp.

S504: The first node determines, from the plurality of pieces of indication information, target indication information that matches the packet attribute.

After obtaining the packet destined for the destination node, the first node may select, from the plurality of pieces of indication information in the route of the destination node, the target indication information that matches the packet attribute carried in the packet.

For example, when determining the target indication information, the first node may determine, based on a correspondence between the packet attribute and the indication information, indication information of the packet attribute carried in the corresponding packet in the correspondence as the target indication information.

For example, the packet attribute is the DSCP priority, and the indication information is the preference value. It is assumed that a correspondence between packet attributes and the indication information is shown in Table 3, and a plurality of preference values carried in the route of the destination node are shown in Table 1. If the packet attribute carried in the packet destined for the destination node is a DSCP priority C1, the first node may determine the preference value B1 corresponding to the DSCP priority C1 in Table 3 as the target indication information that matches the packet attribute carried in the packet. In a possible implementation, values of a DSCP priority and a corresponding preference value may be the same. In this case, it may be understood that the information that is carried in the packet and that is used to determine the target tunnel is the preference value. Alternatively, values of the DSCP priority and the corresponding preference value may be different, but has the correspondence shown in Table 3.

TABLE 3

| DSCP priority | Preference value |
|---|---|
| C1 | B1 |
| C2 | B2 |
| C3 | B3 |
| C4 | B4 |

Optionally, the first node may determine, based on a specific (e.g., predetermined) matching rule, the target indication information that matches the packet attribute carried in the packet destined for the destination node. For example, the first node may determine, based on the packet attribute and a preset matching rule, the indication information that matches the packet attribute, and determine the matched indication information as the target indication information.

S505: The first node determines the target tunnel from the plurality of tunnels based on the target indication information, where a tunnel attribute of the target tunnel corresponds to the target indication information.

In the plurality of tunnels determined by the first node in S502, each tunnel has a corresponding tunnel attribute, and the route of the destination node carries indication information corresponding to the tunnel attribute. In S505, the first node may determine a tunnel having the tunnel attribute corresponding to the target indication information as the target tunnel.

Optionally, after determining the plurality of tunnels that are in a one-to-one correspondence with the plurality of tunnel attributes carried in the route in S502, the first node may further obtain, based on the indication information corresponding to the tunnel attributes carried in the route of the destination node, indication information corresponding to each tunnel of the plurality of tunnels. The indication information corresponding to each tunnel is indication information corresponding to a tunnel attribute corresponding to the tunnel. When determining the target tunnel from the plurality of tunnels based on target indication information, the first node may determine, based on the indication information corresponding to the plurality of tunnels, a tunnel corresponding to the target indication information as the target tunnel.

For example, the indication information of the tunnel attribute is the preference value of the tunnel attribute. The indication information carried in the route is shown in Table 1, and the plurality of tunnels determined by the first node include the tunnels 1, 2, and 3 shown in Table 2. In this case, as shown in Table 4, the first node may determine the preference value B1 corresponding to the tunnel 1, the preference value B2 corresponding to the tunnel 2, and the preference value B3 corresponding to the tunnel 3. If the target indication information is the preference value B1, the first node may determine the tunnel 1 corresponding to the preference value B1 as the target tunnel.

TABLE 4

| Tunnel | Preference value |
|---|---|
| 1 | B1 |
| 2 | B2 |
| 3 | B3 |

S506: The first node forwards the packet to the second node through the target tunnel.

For example, it is assumed that the plurality of tunnels determined by the first node in S502 based on the plurality of tunnel attributes carried in the route include the tunnels 1, 2, and 3 in FIG. 1.

In an example, target indication information determined by the first node in S504 based on the DSCP priority C1 carried in the packet is the preference value B1 of the color attribute A1 of the tunnel 1. In this case, the first node may determine the tunnel 1 as the target tunnel, and forward the packet to the second node through the tunnel 1.

In another example, target indication information determined by the first node in S504 based on the DSCP priority C2 carried in the packet is the preference value B2 of the color attribute A2 of the tunnel 2. In this case, the first node may determine the tunnel 2 as the target tunnel, and forward the packet to the second node through the tunnel 2.

Figure 8:
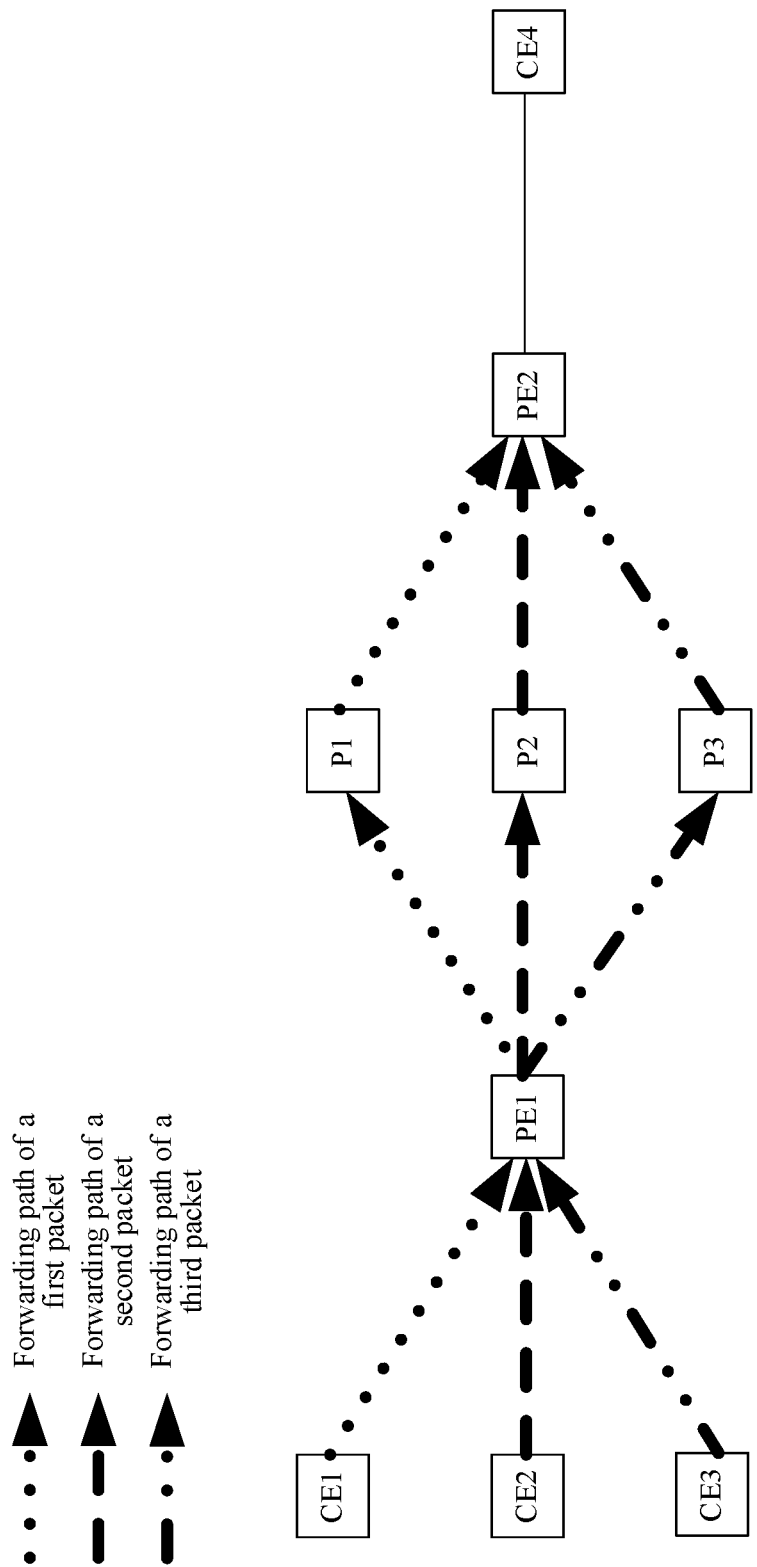
FIG. 8 is a schematic diagram of another packet forwarding path according to an embodiment of this application.

For example, with reference to FIG. 1 and FIG. 8, it is assumed that a first packet sent by the CE1 to the PE1 carries the DSCP priority C1, a second packet sent by the CE2 to the PE1 carries the DSCP priority C2, and a third packet sent by the CE3 to the PE1 carries the DSCP priority C3. In this case, the PE1 forwards the first packet on the tunnel 1 (the first packet is forwarded along a path on which the PE1, the P1, and the PE2 are located), forwards the second packet on the tunnel 2 (the second packet is forwarded along a path on which the PE1, the P2, and the PE2 are located), and forwards the third packet on the tunnel 3 (the third packet is forwarded along a path on which the PE1, the P3, and the PE2 are located).

It can be learned that, in some embodiments, the first node may determine, based on the plurality of tunnel attributes carried in the route sent by the second node, the plurality of tunnels through which the first node forwards, to the second node, the packet destined for the destination node. When forwarding the packet, the first node may select one target tunnel from the plurality of tunnels based on the packet attribute carried in the packet, and forward the packet on the target tunnel. Therefore, different packet attributes may be carried in packets based on different requirements regarding to forwarding performances of the packets, so that packets having different requirements regarding to the forwarding performances can be forwarded over different target tunnels. In this way, requirements of different nodes regarding to forwarding performances of the packets and requirements of a same node regarding to forwarding performances of different packets can be met, thereby improving a packet forwarding effect and implementing traffic steering.

In the related technology, a node may classify packets based on features such as source addresses, destination addresses, source ports, and destination ports of the packets, and transmit different types of packets on different paths. However, in this solution, a classification rule based on the features such as the source addresses, destination addresses, source ports, and destination ports needs to be configured on the node. When a large quantity of packets need to be classified, there is a high amount of information that is to be configured on the node, resulting in the configuration difficulty to be high. However, in the packet forwarding method provided in some embodiments, the classification rule based on the features such as the source addresses, destination addresses, source ports, and destination ports does not need to be configured on the first node, and traffic steering can be implemented at a routing layer. Therefore, an amount of information configured on the node is reduced, and a configuration difficulty of the solution is reduced. In addition, in the embodiment shown in FIG. 5, some correspondences (for example, the foregoing correspondence between the packet attribute and the indication information) are configured on the first node. Compared with the classification rule based on the features such as the source addresses, destination addresses, source ports, and destination ports configured on the first node, less information is configured on the first node in some embodiments.

The route in some embodiments may be a route based on any protocol, for example, a route of border gateway protocol-4 (BGP-4), or a route based on multiprotocol extensions for BGP-4 (MP-BGP). The MP-BGP are multiprotocol extensions of the BGP-4. The MP-BGP may support a conventional Internet Protocol version 4 (IPv4) address family, and may further support another address family, such as a virtual private network-Internet Protocol version 4 (VPN-IPv4) address family and an Internet Protocol version 6 (IPv6) address family.

The tunnel in some embodiments may include one or more paths, and the packet forwarded on the tunnel is forwarded along any path in the tunnel. In the foregoing examples, the tunnel includes one path.

For example, an SR-TE policy tunnel is used as an example. In a policy of the SR-TE policy tunnel, a plurality of candidate paths are included, each candidate path includes one or more segment lists, and each segment list indicates one path. The SR-TE policy tunnel has a head node and a tail node. A head node of a path indicated by each segment list is the head node of the SR-TE policy tunnel, and a tail node of a path indicated by each segment list is the tail node of the SR-TE policy tunnel. The paths of the SR-TE policy tunnel may include a path indicated by each segment list in a candidate path with a highest priority in the plurality of candidate paths.

In the foregoing embodiment, that the first node determines the target tunnel based on the tunnel attributes, the indication information, and the packet attribute is used as an example. Optionally, the first node may determine the target tunnel based on the tunnel attributes and the packet attribute. In this case, the route of the destination node may not carry the foregoing plurality of pieces of indication information.

For example, when the first node determines the target tunnel based on the tunnel attributes and the packet attribute, the first node may not perform the foregoing S504 and S505. Instead, after S503, the first node first determines the target tunnel attribute that matches the packet attribute (for example, the DSCP priority) in the plurality of tunnel attributes (for example, the color attribute), then selects the target tunnel having the target tunnel attribute from the plurality of tunnels determined in S502, and then forwards, in S506, the packet destined for the destination node on the target tunnel. For a process in which the first node determines, from the plurality of tunnel attributes, the target tunnel attribute that matches the packet attribute, refer to the foregoing process in which the first node determines, from the plurality of pieces of indication information, the target indication information that matches the packet attribute. In some embodiments, details are not described herein again.

It can be learned that, in some embodiments, the tunnel attributes carried in the route may be matched with the packet attribute, to determine the target tunnel. In this solution, the tunnel attributes may further have a function of the foregoing indication information. For example, a plurality of color attributes carried in the route received by the first node further have priority attributes. In this case, the route does not need to carry the foregoing indication information, but directly matches the packet attribute using the tunnel attributes, thereby reducing information that needs to be carried in the route.

In the packet forwarding method provided in this application, regardless of whether the first node determines the target tunnel based on the tunnel attributes, the indication information, and the packet attribute, or determines the target tunnel based on the tunnel attributes and the packet attribute, the first node may first determine the plurality of tunnels based on the plurality of tunnel attributes, and then determine the target tunnel from the plurality of tunnels based on the packet attribute.

With reference to FIG. 1 to FIG. 8, the foregoing describes in detail the packet forwarding method provided in this application. It may be understood that, to implement the functions described in the foregoing methods, the nodes need to include corresponding hardware and/or software modules corresponding to the functions. This application can be implemented in a form of hardware or a combination of hardware and computer software with reference to the execution processes of the methods described in embodiments disclosed in this specification. Whether a function is performed by hardware or hardware driven by computer software depends on particular applications and design constraints of the technical solutions. A person skilled in the art may use different manners to implement the described functions for each particular application with reference to the embodiments, but it should not be considered that this implementation goes beyond the scope of this application.

In this embodiment, a corresponding device may be divided into functional modules based on the foregoing method embodiments. For example, functional modules may be obtained through division based on corresponding functions, or two or more functions may be integrated into one processing module. The integrated module may be implemented in a form of hardware. It should be noted that, in this embodiment, division into the modules is an example, and is specifically a possible logical function division. During actual implementation, another division manner may be used.

Figure 9:
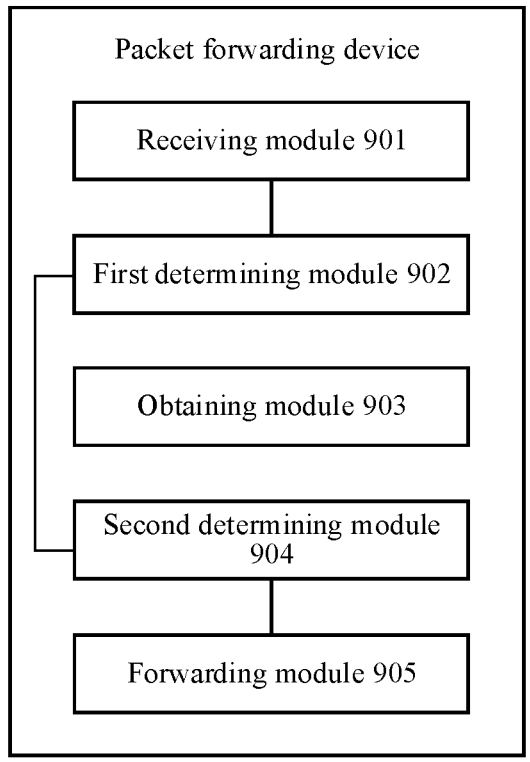
FIG. 9 is a schematic diagram of a structure of a packet forwarding device, according to an embodiment of this application.
Figure 10:
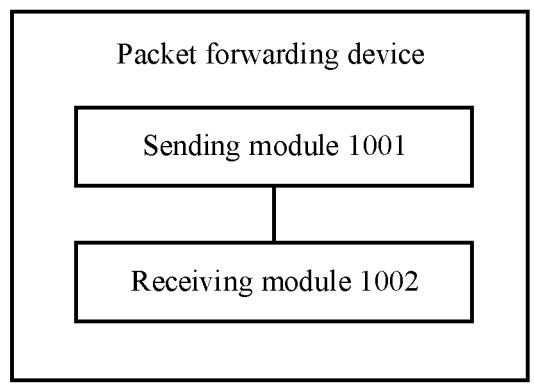
FIG. 10 is a schematic diagram of a structure of another packet forwarding device, according to an embodiment of this application.

When a manner of division into functional modules is used, the following describes a packet forwarding device provided in this application with reference to FIG. 9 and FIG. 10.

FIG. 9 is a block diagram of a packet forwarding device according to an embodiment of this application. For example, the packet forwarding device may be used as the first node in the foregoing embodiments. As shown in FIG. 9, the packet forwarding device includes a receiving module 901, a first determining module 902, an obtaining module 903, a second determining module 904, and a forwarding module 905.

The receiving module 901 is configured to receive a route to a destination node sent by a second node, where the route carries an identifier of the second node and a plurality of tunnel attributes. For an operation performed by the receiving module 901, refer to content related to the first node in S501 in the embodiment shown in FIG. 5.

The first determining module 902 is configured to determine a plurality of tunnels from the first node to the second node based on the plurality of tunnel attributes, where the plurality of tunnels are in a one-to-one correspondence with the plurality of tunnel attributes, and the tunnels have corresponding tunnel attributes. For an operation performed by the first determining module 902, refer to content related to the first node in S502 in the embodiment shown in FIG. 5.

The obtaining module 903 is configured to obtain a packet destined for the destination node, where the packet carries a packet attribute. For an operation performed by the obtaining module 903, refer to content related to the first node in S503 in the embodiment shown in FIG. 5.

The second determining module 904 is configured to determine a target tunnel from the plurality of tunnels based on the packet attribute. For an operation performed by the second determining module 904, refer to content related to the first node in S504 and S505 in the embodiment shown in FIG. 5.

The forwarding module 905 is configured to forward the packet to the second node through the target tunnel. For an operation performed by the forwarding module 905, refer to content related to the first node in S506 in the embodiment shown in FIG. 5.

There may be a plurality of manners for the second determining module 904 to determine the target tunnel from the plurality of tunnels based on the packet attribute. The following uses two manners as examples for description.

In a possible implementation, the route further carries a plurality of pieces of indication information, and the plurality of pieces of indication information are in a one-to-one correspondence with the plurality of tunnel attributes. The second determining module 904 is configured to determine, from the plurality of pieces of indication information, target indication information that matches the packet attribute and determine the target tunnel from the plurality of tunnels based on the target indication information, where a tunnel attribute of the target tunnel corresponds to the target indication information.

In another possible implementation, the second determining module 904 is configured to determine, from the plurality of tunnel attributes, a target tunnel attribute that matches the packet attribute and determine, from the plurality of tunnels, the target tunnel that has the target tunnel attribute.

The route that is of the destination node and that is sent by the second node may carry the plurality of tunnel attributes and the plurality of pieces of indication information in any manner.

Optionally, the route includes a plurality of TLV fields that are in a one-to-one correspondence with the plurality of tunnel attributes, and a TLV field carries a corresponding tunnel attribute. In this case, if the route further carries the indication information, indication information corresponding to a tunnel attribute may be carried in a TLV field corresponding to the tunnel attribute. Certainly, the indication information corresponding to a tunnel attribute may alternatively be carried in another field of the route, instead of a TLV field corresponding to the tunnel attribute.

Optionally, the route includes the plurality of TLV fields that are in a one-to-one correspondence with the plurality of tunnel attributes, and a TLV field carries a corresponding tunnel attribute and indication information corresponding to the tunnel attribute.

The tunnel attributes may be any type of attribute of the tunnel. Optionally, the tunnel attributes include a color attribute.

The indication information may be any type of information. Optionally, the indication information includes a preference value corresponding to the color attribute.

The packet destined for the destination node carries the packet attribute, and the packet attribute may be any type of attribute of the packet. Optionally, the packet attribute includes at least one of a DSCP priority, an IP priority, an 802.1p priority, or an MPLS Exp.

In conclusion, in the packet forwarding device provided in some embodiments, the first determining module may determine, based on the plurality of tunnel attributes carried in the route sent by the second node, the plurality of tunnels through which the first node forwards, to the second node, the packet destined for the destination node. Before the forwarding module forwards the packet, the second determining module may select one target tunnel from the plurality of tunnels based on the packet attribute carried in the packet, so that the forwarding module can forward the packet on the target tunnel. Therefore, different packet attributes may be carried in packets based on different requirements on forwarding performance of the packets, so that packets having different requirements on the forwarding performance can be forwarded over different target tunnels. In this way, requirements of different nodes with regards to forwarding performances of packets and requirements of a same node with regards to forwarding performances of different packets can be met, thereby improving a packet forwarding effect and implementing traffic steering.

When an integrated unit is used, the packet forwarding device provided in this application serving as the first node may include a processing module, a storage module, and a communication module. The processing module may be configured to control and manage actions of the packet forwarding device, for example, may be configured to support the packet forwarding device in performing the actions performed by the first node in S501 to S506. The storage module may be configured to support the packet forwarding device in storing program code, data, and the like. The communication module may be configured for communication between the packet forwarding device and another device.

The processing module may be a processor or a controller. The processor may implement or execute various example logical blocks, modules, and circuits described with reference to content disclosed in this application. The processor may alternatively be a combination for implementing a computing function, for example, a combination including one or more microprocessors or a combination of a digital signal processor (DSP) and a microprocessor. The storage module may be a memory. The communication module may be a device that interacts with another device, for example, a radio frequency circuit, a Bluetooth chip, or a Wi-Fi chip.

In an embodiment, when the processing module is a processor, the storage module is a memory, and the communication module is a communication interface, the packet forwarding device in some embodiments may be a communication device having the structure shown in FIG. 4. In an implementation, the foregoing modules and the like included in the packet forwarding device may be computer programs stored in the memory, and the computer programs are invoked by the processor to implement execution functions corresponding to the modules.

FIG. 10 is a block diagram of another packet forwarding device according to an embodiment of this application. For example, the packet forwarding device may be used as the second node in the foregoing embodiments. As shown in FIG. 10, the packet forwarding device includes a sending module 1001 and a receiving module 1002.

The sending module 1001 is configured to send a route of a destination node to a first node, where the route carries an identifier of a second node and a plurality of tunnel attributes. The route is configured to indicate the first node to determine a plurality of tunnels from the first node to the second node based on the plurality of tunnel attributes, determine a target tunnel from the plurality of tunnels based on a packet attribute carried in a packet destined for the destination node, and forward the packet to the second node through the target tunnel. The plurality of tunnels are in a one-to-one correspondence with the plurality of tunnel attributes, and t tunnels have corresponding tunnel attributes. For an operation performed by the sending module 1001, refer to content related to the second node in S501 in the embodiment shown in FIG. 5.

The receiving module 1002 is configured to receive the packet forwarded by the first node through the target tunnel. For an operation performed by the receiving module 1002, refer to content related to the second node in S506 in the embodiment shown in FIG. 5.

The foregoing route may be implemented in a plurality of manners. The following uses two manners as examples for description.

In a possible implementation, the route further carries a plurality of pieces of indication information, and the plurality of pieces of indication information are in a one-to-one correspondence with the plurality of tunnel attributes.

The route is configured to indicate the first node to determine, from the plurality of pieces of indication information, target indication information that matches the packet attribute and determine the target tunnel from the plurality of tunnels based on the target indication information, where a tunnel attribute of the target tunnel corresponds to the target indication information.

In another possible implementation, the route is configured to indicate the first node to determine, in the plurality of tunnel attributes carried in the route, a target tunnel attribute that matches the packet attribute and determine, from the plurality of tunnels, the target tunnel that has the target tunnel attribute.

The route that is of the destination node and that is sent by the second node may carry the plurality of tunnel attributes and the plurality of pieces of indication information in any manner.

Optionally, the route includes a plurality of TLV fields that are in a one-to-one correspondence with the plurality of tunnel attributes, and a TLV field carries a corresponding tunnel attribute. In this case, if the route further carries the indication information, indication information corresponding to a tunnel attribute may be carried in a TLV field corresponding to the tunnel attribute. Certainly, the indication information corresponding to a tunnel attribute may alternatively be carried in another field of the route, instead of a TLV field corresponding to the tunnel attribute.

Optionally, the route includes the plurality of TLV fields that are in a one-to-one correspondence with the plurality of tunnel attributes, and a TLV field carries a corresponding tunnel attribute and indication information corresponding to the tunnel attribute.

The tunnel attributes may be any type of attribute of the tunnel. Optionally, the tunnel attributes include a color attribute.

The indication information may be any type of information. Optionally, the indication information includes a preference value corresponding to the color attribute.

The packet destined for the destination node carries the packet attribute, and the packet attribute may be any type of attribute of the packet. Optionally, the packet attribute includes at least one of a DSCP priority, an IP priority, an 802.1p priority, or an MPLS Exp.

In conclusion, in the packet forwarding device provided in some embodiments, the route sent by the sending module to the first node carries the plurality of tunnel attributes. Therefore, the first node can determine, based on the plurality of tunnel attributes, the plurality of tunnels through which the first node forwards, to the second node, the packet destined for the destination node. When forwarding the packet, the first node may select one target tunnel from the plurality of tunnels based on the packet attribute carried in the packet, and forward the packet on the target tunnel. Therefore, different packet attributes may be carried in packets based on different requirements on forwarding performance of the packets, so that packets having different requirements on the forwarding performance can be forwarded over different target tunnels. In this way, requirements of different nodes on forwarding performance of packets and requirements of a same node on forwarding performance of different packets can be met, thereby improving a packet forwarding effect and implementing traffic steering.

When an integrated unit is used, the packet forwarding device provided in this application serving as the second node may include a processing module, a storage module, and a communication module. The processing module may be configured to control and manage actions of the packet forwarding device, for example, may be configured to support the packet forwarding device in performing the actions performed by the second node in S501 to S506. The storage module may be configured to support the packet forwarding device in storing program code, data, and the like. The communication module may be configured for communication between the packet forwarding device and another device.

For the processing module, the storage module, and the communication module, respectively refer to the processing module, the storage module, and the communication module in the packet forwarding device serving as the first node. In some embodiments, details are not described herein again.

In an embodiment, when the processing module is a processor, the storage module is a memory, and the communication module is a communication interface, the packet forwarding device in this embodiment may be a communication device having the structure shown in FIG. 4. In an implementation, the foregoing modules and the like included in the packet forwarding device may be computer programs stored in the memory, and the computer programs are invoked by the processor to implement execution functions corresponding to the modules.

An embodiment of this application provides a communication system. A structure of the communication system may be shown in FIG. 3. The communication system may include a first node and a second node. For functions of the first node and the second node, refer to corresponding functions described in the foregoing embodiments. In some embodiments, details are not described herein again.

An embodiment of this application provides a computer-readable storage medium. The storage medium stores a computer program, and the computer program is configured to perform the method performed by the first node in any packet forwarding method provided in embodiments of this application.

An embodiment of this application provides another computer-readable storage medium. The storage medium stores a computer program, and the computer program is configured to perform the method performed by the second node in any packet forwarding method provided in embodiments of this application.

An embodiment of this application provides a computer program product including instructions. When the computer program product is run on a packet forwarding device, the packet forwarding device is enabled to perform the method performed by the first node in any packet forwarding method provided in embodiments of this application.

An embodiment of this application provides a computer program product including instructions. When the computer program product is run on a packet forwarding device, the packet forwarding device is enabled to perform the method performed by the second node in any packet forwarding method provided in embodiments of this application.

All or some of the foregoing embodiments may be implemented by software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the processes or functions described in embodiments of this application are generated. The computer may be a general-purpose computer, a computer network, or another programmable apparatus. The computer instructions may be stored in a computer-readable storage medium, or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage apparatus such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In this application, the terms "first", "second", and the like are merely intended for description, but cannot be understood as an indication or implication of relative importance. The term "at least one" means one or more, and the term "a plurality of" means two or more, unless expressly limited otherwise.

For different types of embodiments such as the method embodiments and the apparatus embodiments provided in embodiments of this application, refer to each other. This is not limited in embodiments of this application. A sequence of the operations of the method embodiments provided in embodiments of this application can be properly adjusted, and the operations can be correspondingly added or deleted based on a situation. Any method that can be easily figured out by a person skilled in the art within the technical scope disclosed in this application shall fall within the protection scope of this application. Therefore, details are not described again.

In the corresponding embodiments provided in this application, it should be understood that, the disclosed system, device, apparatus, and the like may be implemented in other constitute manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

The units described as separate parts may or may not be physically separate, and parts described as units may or may not be physical units, may be located in one position, or may be distributed on a plurality of devices. Some or all of the units may be selected based on actual requirements to achieve the objectives of the solutions of the embodiments.

The foregoing descriptions are merely embodiments of this application, but are not intended to limit the protection scope of this application. Any modification or replacement easily figured out by a person skilled in the art within the technical scope disclosed in this application shall fall within the protection scope of this application. Therefore, the protection scope of this application shall be subject to the protection scope of the claims.

What is claimed is:

1. A packet forwarding method performed by a first node, the method comprising:
   receiving a route to a destination node sent by a second node, wherein the route carries an identifier of the second node and a plurality of tunnel attributes, wherein the plurality of tunnel attributes are in a one-to-one correspondence with a plurality of tunnels from the first node to the second node;
   obtaining a first packet destined for the destination node, wherein the first packet carries a first packet attribute;
   determining a first tunnel from the plurality of tunnels based on the first packet attribute and the plurality of tunnel attributes; and
   forwarding the first packet to the second node through the first tunnel of the plurality of tunnels;
   wherein the route further carries a plurality of pieces of indication information, and the plurality of pieces of indication information are in a one-to-one correspondence with the plurality of tunnel attributes, and the method further comprises:
   determining, from the plurality of pieces of indication information, first indication information that matches the first packet attribute; and
   determining the first tunnel from the plurality of tunnels based on the first indication information, wherein a tunnel attribute of the first tunnel corresponds to the first indication information.

2. The method according to claim 1, wherein the method further comprises:
   determining, from the plurality of tunnel attributes, a first tunnel attribute that matches the first packet attribute; and
   determining, from the plurality of tunnels, the first tunnel that has the first tunnel attribute.

3. The method according to claim 2, wherein the route comprises a plurality of type length value (TLV) fields that are in a one-to-one correspondence with the plurality of tunnel attributes, and the TLV fields carry corresponding tunnel attributes.

4. The method according to claim 1, wherein the route comprises a plurality of TLV fields that are in a one-to-one correspondence with the plurality of tunnel attributes, and the TLV fields carry corresponding tunnel attributes and the indication information corresponding to the tunnel attributes.

5. The method according to claim 1, wherein the tunnel attributes comprise a color attribute.

6. The method according to claim 5, wherein the indication information comprises a preference value corresponding to the color attribute.

7. The method according to claim 1, wherein the first packet attribute comprises at least one of a differentiated services code point (DSCP) priority, an Internet Protocol (IP) priority, an 802.1p priority, or a multiprotocol label switching experimental bits (MPLS Exp) priority.

8. The method according to claim 1, wherein the method further comprises:
   obtaining a second packet destined for the destination node, wherein the second packet carries a second packet attribute; and
   forwarding the second packet, based on the second packet attribute and the tunnel attributes, to the second node through a second tunnel of the plurality of tunnels.

9. A packet forwarding device for a first node, comprising:
   a processor and a memory storing a program, the processor being configured to execute the program stored in the memory, to enable the packet forwarding device to:
      receive a route to a destination node sent by a second node, wherein the route carries an identifier of the second node and a plurality of tunnel attributes, wherein the plurality of tunnel attributes are in a one-to-one correspondence with a plurality of tunnels from the first node to the second node;
      obtain a first packet destined for the destination node, wherein the first packet carries a first packet attribute;
      determine a first tunnel from the plurality of tunnels based on the first packet attribute and the tunnel attributes; and
      forward the first packet to the second node through the first tunnel of the plurality of tunnels;
   wherein the route further carries a plurality of pieces of indication information, and the plurality of pieces of indication information are in a one-to-one correspondence with the plurality of tunnel attributes, and the processor is further configured to execute the program stored in the memory, to enable the packet forwarding device to:
      determine, from the plurality of pieces of indication information, first indication information that matches the first packet attribute; and
      determine the first tunnel from the plurality of tunnels based on the first indication information, wherein a tunnel attribute of the first tunnel corresponds to the first indication information.

10. The packet forwarding device according to claim 9, wherein the processor is further configured to execute the program stored in the memory, to enable the packet forwarding device further to:
    determine, from the plurality of tunnel attributes, a first tunnel attribute that matches the first packet attribute; and
    determine, from the plurality of tunnels, the first tunnel that has the first tunnel attribute.

11. The packet forwarding device according to claim 9, wherein the route comprises a plurality of type length value (TLV) fields that are in a one-to-one correspondence with the plurality of tunnel attributes, and the TLV fields carry corresponding tunnel attributes.

12. The packet forwarding device according to claim 9, wherein the route comprises a plurality of TLV fields that are in a one-to-one correspondence with the plurality of tunnel attributes, and the TLV fields carry corresponding tunnel attributes and the indication information corresponding to the tunnel attributes.

13. The packet forwarding device according to claim 9, wherein the tunnel attributes comprise a color attribute.

14. The packet forwarding device according to claim 13, wherein the indication information comprises a preference value corresponding to the color attribute.

15. The packet forwarding device according to claim 9, wherein the packet attribute comprises at least one of a differentiated services code point (DSCP) priority, an Internet Protocol (IP) priority, an 802.1p priority, or a multiprotocol label switching experimental bits (MPLS Exp) priority.

16. The packet forwarding device according to claim 9, wherein the processor is configured to execute the program stored in the memory, to enable the packet forwarding device further to:
    obtain a second packet destined for the destination node, wherein the second packet carries a second packet attribute; and
    forward the second packet, based on the second packet attribute and the tunnel attributes, to the second node through a second tunnel of the plurality of tunnels.

17. A communication system, wherein the communication system comprises a first node and a second node, wherein:
    the second node is configured to send a route of a destination node to the first node, wherein the route carries an identifier of the second node and a plurality of tunnel attributes, and the plurality of tunnel attributes are in a one-to-one correspondence with a plurality of tunnels from the first node to the second node; and
    wherein the first node is configured to:
       obtain a first packet destined for the destination node, wherein the first packet carries a first packet attribute; and
       forward the first packet, based on the first packet attribute and the tunnel attributes, to the second node through a first tunnel of the plurality of tunnels;
    wherein the route further carries a plurality of pieces of indication information, and the plurality of pieces of indication information are in a one-to-one correspondence with the plurality of tunnel attributes, and the first node is further configured to:
       determine, from the plurality of pieces of indication information, first indication information that matches the first packet attribute; and determine the first tunnel from the plurality of tunnels based on the first indication information, wherein a tunnel attribute of the first tunnel corresponds to the first indication information.

18. The communication system according to claim 17, wherein the first node is further configured to:
obtain a second packet destined for the destination node, wherein the second packet carries a second packet attribute; and
forward the second packet, based on the second packet attribute and the tunnel attributes, to the second node through a second tunnel of the plurality of tunnels.

\* \* \* \* \*

UNITED STATES PATENT AND TRADEMARK OFFICE
CERTIFICATE OF CORRECTION

PATENT NO. : 12,483,502 B2  
APPLICATION NO. : 18/366920  
DATED : November 25, 2025  
INVENTOR(S) : Jiao He et al.

Page 1 of 1

It is certified that error appears in the above-identified patent and that said Letters Patent is hereby corrected as shown below:

In the Claims

In Column 26, Claim 10, Line 4, delete "is further configured" and insert -- is configured --, therefor.

Signed and Sealed this  
Tenth Day of February, 2026

John A. Squires  
*Director of the United States Patent and Trademark Office*